United States Patent
Sawada et al.

(10) Patent No.: US 7,421,333 B2
(45) Date of Patent: Sep. 2, 2008

(54) MONITORING SYSTEM FOR INTERNAL COMBUSTION ENGINE

(75) Inventors: Hiroshi Sawada, Gotenba (JP); Daisuke Shibata, Numazu (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 247 days.

(21) Appl. No.: 10/584,775

(22) PCT Filed: May 11, 2005

(86) PCT No.: PCT/JP2005/009002

§ 371 (c)(1),
(2), (4) Date: Jun. 28, 2006

(87) PCT Pub. No.: WO2005/108766

PCT Pub. Date: Nov. 17, 2005

(65) Prior Publication Data

US 2008/0066447 A1    Mar. 20, 2008

(30) Foreign Application Priority Data

May 12, 2004    (JP) .............................. 2004-142493

(51) Int. Cl.
 *B60T 7/12* (2006.01)
 *F02M 25/07* (2006.01)
(52) U.S. Cl. .................. 701/108; 123/568.21
(58) Field of Classification Search ............ 123/568.11, 123/568.21, 568.22, 568.23, 568.26, 568.31, 123/575; 701/103, 108, 109
See application file for complete search history.

(56) References Cited

U.S. PATENT DOCUMENTS

| | | | |
|---|---|---|---|
| 6,739,177 B2 * | 5/2004 | Sato et al. | 73/23.31 |
| 7,111,455 B2 * | 9/2006 | Okugawa et al. | 60/295 |
| 2004/0158387 A1 * | 8/2004 | Yasui et al. | 701/108 |
| 2004/0177605 A1 * | 9/2004 | Kojima et al. | 60/274 |

FOREIGN PATENT DOCUMENTS

| | | |
|---|---|---|
| JP | A 59-158342 | 9/1984 |
| JP | A 4-8845 | 1/1992 |
| JP | A 10-159640 | 6/1998 |
| JP | A 2002-21622 | 1/2002 |
| JP | A 2003-120399 | 4/2003 |

\* cited by examiner

*Primary Examiner*—John T Kwon
(74) *Attorney, Agent, or Firm*—Oliff & Berridge, PLC

(57) ABSTRACT

A technique is provided which can specify a member in which malfunction really occurs when there exists malfunction in at least one of a plurality of state values representing the state of an internal combustion engine. When an amount of fresh intake air is controlled by increasing and decreasing an amount of EGR gas in a feedback manner, and when an amount of fuel to be added to an exhaust gas is controlled based on an air fuel ratio sensor in a feedback manner, a determination is made, based on the result of comparison between output values and command values of members to be detected and corresponding reference values, as to in which member malfunction occurs. Such a determination is based on the fact that relations between output values and command values of the members to be detected and corresponding reference values in individual operating states are different from one another depending on sensors or devices in which malfunction occurs.

6 Claims, 7 Drawing Sheets

| DEVICE WHOSE STATE VALUE IS CHANGED / DEVICE WHOSE MANIFUNCTION IS TO BE DETECTED | LEAN | | | | |
|---|---|---|---|---|---|
| | AIR FUEL RATIO SENSOR | EXHAUST GAS TEMPERATURE SENSOR | AIR FLOW METER | FUEL INJECTION COMMAND VALUE | EGR GAS COMMAND VALUE |
| AIR FUEL RATIO SENSOR | O | | | | |
| EXHAUST GAS TEMPERATURE SENSOR | | O | | | |
| AIR FLOW METER | O | O | | | O |
| FUEL INJECTION VALVE | O | O | | | |
| FUEL ADDITION VALVE | | | | | |

| DEVICE WHOSE STATE VALUE IS CHANGED / DEVICE WHOSE MANIFUNCTION IS TO BE DETECTED | RICH | | | | | |
|---|---|---|---|---|---|---|
| | AIR FUEL RATIO SENSOR | EXHAUST GAS TEMPERATURE SENSOR | AIR FLOW METER | FUEL INJECTION COMMAND VALUE | FUEL ADDITION COMMAND VALUE | EGR GAS COMMAND VALUE |
| AIR FUEL RATIO SENSOR | | O | | | O | |
| EXHAUST GAS TEMPERATURE SENSOR | | O | | | | |
| AIR FLOW METER | | O | | | | O |
| FUEL INJECTION VALVE | | | | | O | |
| FUEL ADDITION VALVE | | | | | O | |

Fig. 2

MONITORING SYSTEM FOR INTERNAL COMBUSTION ENGINE

TECHNICAL FIELD

The present invention relates to monitor for malfunction of an internal combustion engine.

BACKGROUND ART

By providing an air fuel ratio sensor to an exhaust system of an internal combustion engine, the amount of fuel to be supplied can be controlled in a feedback manner based on an air fuel ratio of an air fuel mixture obtained from the air fuel ratio sensor. However, the detected value of the air fuel ratio sensor varies in accordance with the degradation thereof. Accordingly, in order to. perform accurate feedback control, it is important to detect malfunction of the air fuel ratio sensor.

Thus, there has been known a technique in which an output value of the air fuel ratio sensor in a specific operating state is compared with a reference value thereby to detect malfunction of the air fuel ratio sensor (see, for example, a first patent document (Japanese patent application laid-open No. H10-159640) and a second patent document (Japanese patent application laid-open No. H4-8845).

However, the output value of the air fuel ratio sensor changes, other than when malfunction occurs in the air fuel sensor, due to malfunction of other devices such as, for example, malfunction in the detection of an air flow meter, malfunction in the amount of fuel injected, and so on. Thus, in case where the output value of the air fuel ratio sensor has changed, it is difficult to determine whether such a change has been caused by the malfunction of the air fuel ratio sensor or malfunction of other devices. As a result, it becomes difficult to make an accurate determination as to whether the air fuel ratio sensor is malfunction or fail. Also, this can be similarly applied to an exhaust gas temperature sensor.

DISCLOSURE OF THE INVENTION

The present invention has been made in view of the above-mentioned problems, and has for its object to provide a technique which can specify a member in which malfunction has really occurred in case where there exists malfunction in at least one of a plurality of state values representing the state of an internal combustion engine.

In order to achieve the above object, a malfunction detection system for an internal combustion engine according to the present invention adopts the following technique. That is, the malfunction detection system may be characterized by comprising:

an air fuel ratio detection section that detects the air fuel ratio of an exhaust gas of an internal combustion engine;

an EGR device that connects an intake system and an exhaust system of said internal combustion engine for recirculating a part of the exhaust gas to the intake system;

an exhaust gas air fuel ratio feedback control section that controls, in a feedback manner, the air fuel ratio of the exhaust gas to a predetermined air fuel ratio based on the air fuel ratio of the exhaust gas detected by said air fuel ratio detection section;

an intake air amount feedback control section that changes the amount of the exhaust gas recirculated by said EGR device in such a manner that the amount of fresh air sucked to said internal combustion engine is adjusted to a target amount;

a state value detection section that detects the state values of a plurality of items, respectively, related to a change in the air fuel ratio of the exhaust gas in individual operating states including when said engine is in a first operating state in which feedback control according to said exhaust gas air fuel ratio feedback control section is not performed but feedback control according to said intake air amount feedback control section is performed, and when said engine is in a second operating state in which both feedback control according to said exhaust gas air fuel ratio feedback control section and feedback control according to said intake air amount feedback control section are performed;

a first item identification section that identifies items whose state values detected by said state value detection section in said first operating state are outside of a normal value range that is set with respect to the state value of each item in said first operating state;

a second item identification section that identifies items whose state values detected by said state value detection section in said second operating state are outside of a normal value range that is set with respect to the state value of each item in said second operating state; and a malfunction item identification section that identifies which item is malfunction, from the items specified by said first item identification section and from the items identified by said second item identification section.

A major feature of the present invention resides in that a plurality of state values in two different operating states of an internal combustion engine, and a determination is made, based on the result of comparison between the plurality of state values and corresponding reference values, as to in which items malfunction has occurred.

Here, note that in case where intake air amount feedback control is carried out, the amount of fresh intake air related to the air fuel ratio of the exhaust gas varies even when malfunction occurs in one item. In addition, in case where exhaust gas air fuel ratio feedback control is performed, the air fuel ratio of the exhaust gas varies, so a malfunction occurring in one item in the first or second operating state might be offset or cancelled, and it sometimes becomes difficult to specify in which item the malfunction has occurred.

However, though the state value of one item might become out of the normal range when malfunction has occurred in the one item in the first operating state or the second operating state, the state value of an item other than that item in which malfunction has occurred might become out of the normal range depending upon the malfunction thus occurred. There is a certain relation between the item with the malfunction occurring therein and the item whose state value is out of the normal range, so it is possible to specify or identify the item in which malfunction has actually occurred by specifying or identifying the item whose state value is out of the normal range. Here, in the two operating states which are different from each other in the kind or type of feedback control to be performed, a relation between the item in which malfunction actually occurs and the item whose state value becomes out of the normal range in one operating state is different from that in the other operating state, respectively, so it becomes easy to specify or identify in which item malfunction actually occurs by specifying the item whose state value becomes out of the normal range in the two different operating states.

Here, note that in the present invention, an item lying in its normal range set with respect to the state value of each item in the first operating state or in the second operating state may be specified or identified, and an item in which malfunction occurs may be specified or identified based on the item thus specified or identified.

In addition, in order to achieve the above-mentioned object, a malfunction detection system for an internal combustion engine according to the present invention may adopt the following technique. That is, the malfunction detection system may be characterized by comprising:

an air fuel ratio detection section that detects the air fuel ratio of an exhaust gas of an internal combustion engine;

an EGR device that connects an intake system and an exhaust system of said internal combustion engine for recirculating a part of the exhaust gas to the intake system;

an exhaust gas air fuel ratio feedback control section that controls, in a feedback manner, the air fuel ratio of the exhaust gas to a predetermined air fuel ratio based on the air fuel ratio of the exhaust gas detected by said air fuel ratio detection section;

an intake air amount feedback control section that changes the amount of the exhaust gas recirculated by said EGR device in such a manner that the amount of fresh air sucked to said internal combustion engine is adjusted to a target amount;

a first state value detection section that detects the state values of a plurality of items, respectively, related to a change in the air fuel ratio of the exhaust gas in a first operating state in which feedback control according to said exhaust gas air fuel ratio feedback control section is not performed but feedback control according to said intake air amount feedback control section is performed;

a first item identification section that identifies items whose state values detected by said state value detection section in said first operating state are outside of a normal value range that is set with respect to the state value of each item in said first operating state;

an exhaust gas air fuel ratio variation section that makes the air fuel ratio of the exhaust gas vary when there are two or more items identified by said first item identification section;

a second state value detection section that detects the state values of a plurality of items, respectively, related to a change in the air fuel ratio of the exhaust gas in a second operating state in which feedback control according to said exhaust gas air fuel ratio feedback control section and feedback control according to said intake air amount feedback control section are performed, after the air fuel ratio of the exhaust gas is made to vary by said exhaust gas air fuel ratio variation section;

a second item identification section that identifies items whose state values detected by said second state value detection section in said second operating state are outside of a normal value range that is set with respect to the state value of each item in said second operating state; and a malfunction item identification section that identifies which item is malfunction, from the items specified by said first item identification section and from the items identified by said second item identification section.

Here, there is a case where an item with malfunction occurring therein might be able to be specified or identified only by a large difference between the state value thereof and a corresponding reference value in the first operating state. In such a case, it is possible to perform early malfunction detection by specifying an item in which malfunction occurs without waiting for the result in the second operating state. In addition, if an item in which malfunction occurs in the first operating state can be specified, there is no need to put the engine into the second operating state, so the processing can be simplified.

Moreover, in order to achieve the above-mentioned object, a malfunction detection system for an internal combustion engine according to the present invention may adopt the following technique. That is, the malfunction detection system may be characterized by comprising:

an air fuel ratio sensor that detects the air fuel ratio of an exhaust gas of an internal combustion engine;

an intake air amount detection device that detects the amount of fresh air sucked to said internal combustion engine;

a fuel injection valve that supplies fuel to a cylinder of said internal combustion engine;

an exhaust gas temperature sensor that detects the temperature of the exhaust gas of said internal combustion engine;

a fuel addition valve that adds fuel to an exhaust passage at a location upstream of said air fuel ratio sensor and said exhaust gas temperature sensor;

a fuel addition amount feedback control section that changes the amount of fuel to be added from said fuel addition valve so as to adjust the air fuel ratio of the exhaust gas detected by said air fuel ratio sensor to a target air fuel ratio when fuel is added from said fuel addition valve;

an EGR device that connects an intake system and an exhaust system of said internal combustion engine for recirculating a part of the exhaust gas to the intake system;

an intake air amount feedback control section that changes the amount of the exhaust gas recirculated by said EGR device in such a manner that the amount of fresh air detected by said intake air amount detection device is adjusted to a target amount;

a lean-time air fuel ratio difference calculation section that determines whether a difference between the air fuel ratio detected by said air fuel ratio sensor and said reference lean air fuel ratio is greater than or equal to a first predetermined value when feedback control according to said intake air amount feedback control section is performed but feedback control according to said fuel addition amount feedback control section is not performed, with said internal combustion engine being operated to achieve a reference lean air fuel ratio set as a target;

a lean-time exhaust gas temperature difference calculation section that determines whether a difference between the exhaust gas temperature detected by said exhaust gas temperature sensor and a reference exhaust gas temperature at this time is greater than or equal to a second predetermined value when feedback control according to said intake air amount feedback control section is performed but feedback control according to said fuel addition amount feedback control section is not performed, with said internal combustion engine being operated to achieve a reference lean air fuel ratio set as a target; and a rich-time exhaust gas temperature difference calculation section that determines whether a difference between the exhaust gas temperature, which is detected by said exhaust gas temperature sensor when the addition of fuel from said fuel addition valve, feedback control according to said fuel addition amount feedback control section and feedback control according to said intake air amount feedback control section are performed in such a manner that the air fuel ratio detected by said air fuel ratio sensor is adjusted to a reference rich air fuel ratio, and a reference exhaust gas temperature at this time is greater than or equal to a third predetermined value.

When it is determined by said lean-time air fuel ratio difference calculation section that the difference between the air fuel ratio detected by said air fuel ratio sensor and said reference lean air fuel ratio is greater than or equal to a first predetermined value, and when it is determined by said lean-time exhaust gas temperature difference calculation section that the difference between the exhaust gas temperature detected by said exhaust gas temperature sensor and a reference exhaust gas temperature at this time is less than said second predetermined value, it is specified that malfunction occurs in said air fuel ratio sensor.

When it is determined by said lean-time air fuel ratio difference calculation section that the difference between the air fuel ratio detected by said air fuel ratio sensor and said reference lean air fuel ratio is less than the first predetermined value, and when it is determined by said lean-time exhaust gas temperature difference calculation section that the difference between the exhaust gas temperature detected by said exhaust gas temperature sensor and the reference exhaust gas temperature at this time is greater than or equal to the second predetermined value, it is specified that malfunction occurs in said exhaust gas temperature sensor.

When it is determined by said lean-time air fuel ratio difference calculation section that the difference between the air fuel ratio detected by said air fuel ratio sensor and said reference lean air fuel ratio is greater than or equal to the first predetermined value, and when it is determined by said lean-time exhaust gas temperature difference calculation section that the difference between the exhaust gas temperature detected by said exhaust gas temperature sensor and the reference exhaust gas temperature at this time is greater than or equal to the second predetermined value, and further when it is determined by said rich-time exhaust gas temperature difference calculation section that the difference between the exhaust gas temperature detected by said exhaust gas temperature sensor and the reference exhaust gas temperature at this time is less than the third predetermined value, it is specified that malfunction occurs in the amount of injection of said fuel injection valve.

It may be characterized that when it is determined by said lean-time air fuel ratio difference calculation section that a difference between the air fuel ratio detected by said air fuel ratio sensor and said reference lean air fuel ratio is greater than or equal to the first predetermined value, and when it is determined by said lean-time exhaust gas temperature difference calculation section that the difference between the exhaust gas temperature detected by said exhaust gas temperature sensor and the reference exhaust gas temperature at this time is greater than or equal to the second predetermined value, and further when it is determined by said rich-time exhaust gas temperature difference calculation section that the difference between the exhaust gas temperature detected by said exhaust gas temperature sensor and the reference exhaust gas temperature at this time is greater than or equal to the third predetermined value, it is specified that there is malfunction in said intake air amount detection device.

Here, when fuel addition amount feedback control according to said fuel addition amount feedback control section is not performed, and when said internal combustion engine is operated at the reference lean air fuel ratio, malfunction might occur in the air fuel ratio sensor if a difference between the output value of the air fuel ratio sensor and the reference lean air fuel ratio is greater than or equal to a predetermined value. However, since the output value of the air fuel ratio sensor changes similarly even if there is malfunction in the intake air amount detection device or the fuel injection valve, it is difficult to distinguish, only with the output value of the air fuel ratio sensor, whether there is malfunction in the air fuel ratio sensor, in the intake air amount detection device or the fuel injection valve.

In this respect, when there is malfunction in the air fuel ratio sensor, the difference between the detected value of the exhaust gas temperature sensor at the reference lean air fuel ratio and a reference detected value at this time (hereinafter referred to as a reference exhaust gas temperature) becomes less than a predetermined value. That is, when there is malfunction in the fuel injection valve, the temperature of the exhaust gas changes in accordance with a change in the amount of injection fuel, whereas when there is malfunction in the intake air amount detection device, the amount of intake air is controlled in a feedback manner so that the amount of intake air is thereby changed, thus resulting in a change in the temperature of the exhaust gas. Accordingly, even in either case, the detected value of the exhaust gas temperature sensor changes, so the difference thereof with respect to the reference exhaust gas temperature becomes large. However, when there is malfunction in the air fuel ratio sensor, the actual air fuel ratio of the exhaust gas does not change and the feedback control based on the air fuel ratio of the exhaust gas is not performed. As a result, the detected value of the exhaust gas temperature sensor does not change, so there is substantially no difference thereof with respect to the reference exhaust gas temperature, thus making it possible to determine a malfunction of the air fuel ratio sensor.

In addition, when malfunction occurs in the exhaust gas temperature sensor, the difference between the detected value of the exhaust gas temperature sensor and the reference exhaust gas temperature becomes greater than or equal to the predetermined value. However, even if malfunction occurs in the exhaust gas temperature sensor, the air fuel ratio would not be changed, so there will be substantially no difference between the detected value of the air fuel ratio sensor and the corresponding reference value. As a result, it is possible to determine the malfunction of the exhaust gas temperature sensor.

On the other hand, when there is malfunction in the intake air amount detection device or in the fuel injection valve, the difference between the detected value of the exhaust gas temperature sensor at the reference lean air fuel ratio and the reference exhaust gas temperature becomes greater than or equal to the predetermined value, as previously stated.

Moreover, the case where there is malfunction in the fuel injection valve, the output of the internal combustion engine changes. As a result, the degree of accelerator opening is changed, for instance, to increase or decrease the amount of fuel so as to generate an output required of the internal combustion engine. In this case, reference values such as ones for sensors, etc., are determined based on the amount of fuel to be injected from the fuel injection valve, so reference values for the sensors, etc., are changed in accordance with the change of the amount of fuel to be injected. However, the amount of fuel actually injected from the fuel injection valve is different from that in a case where malfunction does not occur in the fuel injection valve. The detected value of the air fuel ratio sensor changes from the reference value for a sensor, etc., to the extent by which the reference value is changed. Also, the exhaust gas temperature detected by the exhaust gas temperature sensor changes from the reference exhaust gas temperature to the extent by which the amount of fuel is changed.

Thus, in case where there is malfunction in the fuel injection valve or in the intake air amount detection device, the detected values of the air fuel ratio sensor and the exhaust gas temperature sensor changes from their reference values when fuel addition amount feedback control according to said fuel addition amount feedback control section is not performed, and when said internal combustion engine is operated at the reference lean air fuel ratio. Therefore, it is difficult to specify or identify in which device malfunction occurs.

In this respect, in cases when fuel is added from said fuel addition valve and the fuel addition amount feedback control on the amount of fuel to be added is performed by said fuel addition amount feedback control section so as to control the air fuel ratio to the reference rich air fuel ratio, and when the amount of fresh air is controlled to the target amount by said intake air amount feedback control section, it is possible to specify in which device malfunction occurs.

Specifically, when malfunction occurs in the intake air amount detection device, the amount of EGR gas is changed by the intake air amount feedback control section in such a manner that the amount of intake air is adjusted to the target value, as a result of which the amount of intake air changes. Accordingly, the temperature of the exhaust gas changes from the reference value, so a difference between the exhaust gas temperature detected by the exhaust gas temperature detection section and the reference exhaust gas temperature becomes large. On the other hand, when malfunction occurs in the fuel injection valve, the output of the internal combustion engine changes, so the degree of accelerator opening is changed, for instance, to increase or decrease the amount of fuel so as to generate the output required of the internal combustion engine. However, the amount of fuel to be added is controlled in a feedback manner by the fuel addition amount. feedback control section, so the air fuel ratio of the exhaust gas becomes proper, and the amount of fresh intake air does not change at this time, either. As a result, even if malfunction occurs in the fuel injection valve, the output value of the exhaust gas temperature sensor becomes substantially equal to the reference value at this time.

Accordingly, in cases when fuel is added from said fuel addition valve and the fuel addition amount feedback control on the amount of fuel to be added is performed by said fuel addition amount feedback control section so as to control the air fuel ratio to the reference rich air fuel ratio, and when the amount of fresh air is controlled to the target amount by said intake air amount feedback control section, and further when the difference between the exhaust gas temperature detected by the exhaust gas temperature sensor and the reference exhaust gas temperature is less than the predetermined value, it can be specified that malfunction occurs in the fuel addition valve. On the other hand, when the difference between the exhaust gas temperature detected by the exhaust gas temperature sensor and the reference exhaust gas temperature is greater than or equal to the predetermined value, it can be specified that malfunction occurs in the intake air amount detection device.

Here, note that when it is determined by said lean-time air fuel ratio difference calculation section that the difference between the air fuel ratio detected by said air fuel ratio sensor and said reference lean air fuel ratio is greater than or equal to the first predetermined value, and when it is determined by said lean-time exhaust gas temperature difference calculation section that the difference between the exhaust gas temperature detected by said exhaust gas temperature sensor and the reference exhaust gas temperature at this time is greater than or equal to the second predetermined value, fuel may be added to the exhaust passage at a location upstream of said air fuel ratio sensor and said exhaust gas temperature sensor. That is, the malfunction detection system may be characterized by comprising:

an air fuel ratio sensor that detects the air fuel ratio of an exhaust gas of an internal combustion engine;

an intake air amount detection device that detects the amount of fresh air sucked to said internal combustion engine;

a fuel injection valve that supplies fuel to a cylinder of said internal combustion engine;

an exhaust gas temperature sensor that detects the temperature of the exhaust gas of said internal combustion engine;

an EGR. device that connects an intake system and an exhaust system of said internal combustion engine for recirculating a part of the exhaust gas to the intake system;

an intake air amount feedback control section that changes the amount of the exhaust gas recirculated by said EGR device in such a manner that the amount of fresh air detected by said intake air amount detection device is adjusted to a target amount;

a lean-time air fuel ratio difference calculation section that determines whether a difference between the air fuel ratio detected by said air fuel ratio sensor and said reference lean air fuel ratio is greater than or equal to a first predetermined value when feedback control according to said intake air amount feedback control section is performed, and when said internal combustion engine is operated to achieve the reference lean air fuel ratio as a target;

a lean-time exhaust gas temperature difference calculation section that determines a difference between the exhaust gas temperature detected by said exhaust gas temperature sensor and a reference exhaust gas temperature at this time is greater than or equal to a second predetermined value when feedback control according to said intake air amount feedback control section is performed, and when said internal combustion engine is operated to achieve the reference lean air fuel ratio as a target;

a fuel addition valve that adds fuel to an exhaust passage at a location upstream of said air fuel ratio sensor and said exhaust gas temperature sensor when it is determined by said lean-time air fuel ratio difference calculation section that the difference between the air fuel ratio detected by said air fuel ratio sensor and said reference lean air fuel ratio is greater than or equal to the first predetermined value, and when it is determined by said lean-time exhaust gas temperature difference calculation section that the difference between the exhaust gas temperature detected by said exhaust gas temperature sensor and the reference exhaust gas temperature at this time is greater than or equal to the second predetermined value;

a fuel addition amount feedback control section that changes the amount of fuel to be added from said fuel addition valve so as to adjust the air fuel ratio of the exhaust gas detected by said air fuel ratio sensor to a reference rich air fuel ratio when fuel is added from said fuel addition valve; and a rich-time exhaust gas temperature difference calculation section that determines whether a difference between the exhaust gas temperature, which is detected by said exhaust gas temperature sensor when the addition of fuel from said fuel addition valve, feedback control according to said fuel addition amount feedback control section and feedback control according to said intake air amount feedback control section are performed, and a reference exhaust gas temperature at this time is greater than or equal to a third predetermined value.

When it is determined by said lean-time air fuel ratio calculation section that the difference between the air fuel ratio detected by said air fuel ratio sensor and said reference lean air fuel ratio is greater than or equal to a first predetermined value, and when it is determined by said lean-time exhaust gas temperature difference calculation section that the difference between the exhaust gas temperature detected by said exhaust gas temperature sensor and the reference exhaust gas temperature at this time is less than the second predetermined value, it is specified that malfunction occurs in said air fuel ratio sensor.

When it is determined by said lean-time air fuel ratio difference calculation section that the difference between the air fuel ratio detected by said air fuel ratio sensor and said reference lean air fuel ratio is less than the first predetermined value, and when it is determined by said lean-time exhaust gas temperature difference calculation section that the difference between the exhaust gas temperature detected by said exhaust gas temperature sensor and the reference exhaust gas temperature at this time is greater than or equal to the second predetermined value, it is specified that malfunction occurs in said exhaust gas temperature sensor.

When it is determined by said rich-time exhaust gas temperature difference calculation section that the difference between the exhaust gas temperature detected by said exhaust gas temperature sensor and the reference exhaust gas temperature at this time is less than the third predetermined value, it is specified that malfunction occurs in the amount of injection of said fuel injection valve.

It may be characterized that when it is determined by said rich-time exhaust gas temperature difference calculation section that the difference between the exhaust gas temperature detected by said exhaust gas temperature sensor and the reference exhaust gas temperature at this time is greater than or equal to the third predetermined value, it is specified that there is malfunction in said intake air amount detection device.

Accordingly, when it can be specified that malfunction occurs in the air fuel ratio sensor or in the exhaust gas temperature sensor, the addition of fuel is never performed, so fuel mileage can be improved.

In the present invention, a plurality of air fuel ratio sensors may be provided, and a final determination section may be further provided that finalizes a malfunction determination of one air fuel ratio sensor in which malfunction is assumed to occur, when it is determined that malfunction occurs in one air fuel ratio sensor, and when a difference between the detected value of the one air fuel ratio sensor, in which malfunction is assumed to occur, and the detected value of another air fuel ratio sensor is greater than or equal to a predetermined value.

For example, when malfunction occurs in another device other than said sensor or the like whose malfunction can be determined, when the air fuel ratio of the exhaust gas is changed from the reference value due to a malfunction or failure of said another device, there is fear that it might be specified by mistake that malfunction occurs in an air fuel ratio sensor. In this respect, in case where there is no malfunction in an air fuel ratio sensor even when malfunction occurs in another device, it is assumed according to the present invention that malfunction occurs in all the plurality of air fuel ratio sensors. . On the other hand, in case where malfunction occurs in one air fuel ratio sensor when no malfunction occurs in said another device, it is assumed that malfunction occurs only in said one air fuel ratio sensor with malfunction occurring therein. From these, when it is specified according to the present invention that malfunction occurs in one air fuel ratio sensor-in the case of the provision of a plurality of air fuel ratio sensors, it can be assumed that malfunction actually occurs in that air fuel ratio sensor. On the other hand, when it is specified according to the present invention that malfunction occurs in all the air fuel ratio sensors, it can be assumed that malfunction actually occurs not in the air fuel ratio sensors but in another device. Thus, a more accurate malfunction determination can be made by comparing the results of malfunction detection of the plurality of air fuel ratio sensors with one another. Here, note that in case where it is specified that malfunction occurs in all the air fuel ratio sensors, malfunction detection may be made again.

As described in the foregoing, in a malfunction detection system for an internal combustion engine according to the present invention, when there is malfunction in the output value of a sensor, it is possible to specify a member in which malfunction really occurs.

BRIEF DESCRIPTION OF THE DRAWINGS

FIG. 2 is a view showing a relation between a device in which malfunction occurs and another device whose state value changes from a reference value.

BEST MODE FOR CARRYING OUT THE INVENTION

Hereinafter, a specific embodiment of a malfunction detection system for an internal combustion engine according to the present invention will be described while referring to the accompanying drawings.

Embodiment 1

Figure 1:
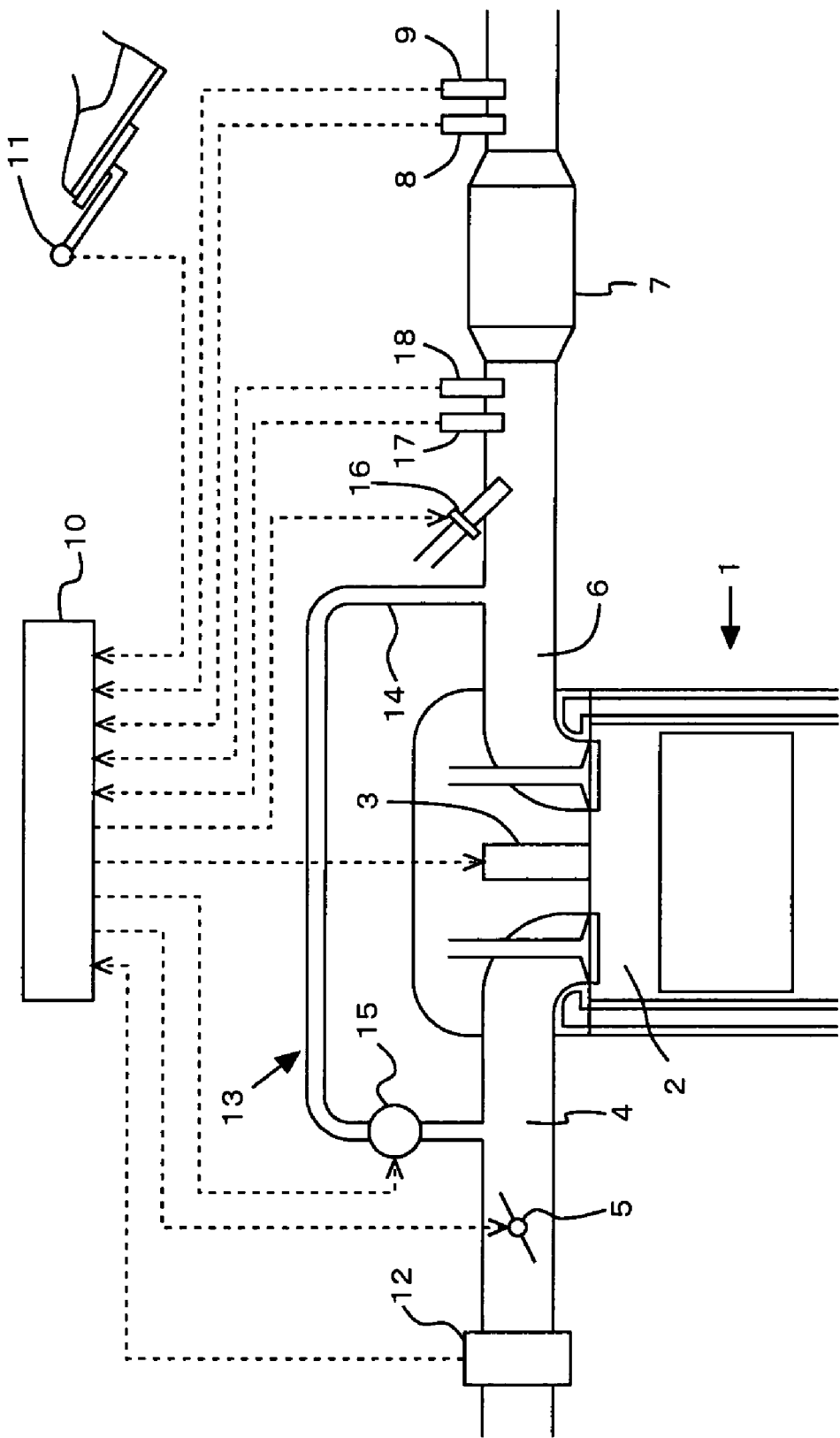
FIG. 1 illustrates the schematic construction of an internal combustion. engine with an intake system and an exhaust system to which a malfunction detection system for an internal combustion engine according to an embodiment-of the present invention is applied.

FIG. 1 illustrates the schematic construction of an internal combustion engine 1 with an intake system and an exhaust system to which a malfunction detection system for an internal combustion engine according to an embodiment of the present invention is applied.

The internal combustion engine 1 illustrated in FIG. 1 is a water-cooled four-cycle diesel engine.

The internal combustion engine 1 is provided with a fuel injection valve 3 for injecting fuel in the form of light oil into a cylinder 2.

In addition, the intake passage 4 is connected with the internal combustion engine 1. A throttle valve 5 is disposed in an intake passage 4 for adjusting the flow rate of intake air flowing through the intake passage 4. In addition, an air flow meter 12 for outputting a signal corresponding to the flow rate of intake air passing through the intake passage 4 is installed on the intake passage 4 at a location upstream of the throttle valve 5. The amourit of intake air sucked into the internal combustion engine 1 can be obtained from the output signal of this air flow meter 12.

On the other hand, an exhaust passage 6 is connected with the internal combustion engine 1. This exhaust passage 6 is in communication at its downstream side with the atmosphere.

A particulate filter 7 (hereinafter referred to as a filter 7) carrying an NOx storage reduction catalyst (hereinafter referred to as a NOx catalyst) is arranged in the exhaust passage 6. In addition, on the exhaust passage 6 at locations downstream of the filter 7, there are mounted an exhaust gas temperature sensor 8 for detecting the temperature of an exhaust gas passing through the exhaust passage 6 and an air fuel ratio sensor 9 for detecting the air fuel ratio of the exhaust gas. In addition, on the exhaust passage 6 at locations upstream of the filter 7, there are mounted an upstream exhaust gas temperature sensor 17 for detecting the temperature of the exhaust gas passing through the exhaust passage 6 and an upstream air fuel ratio sensor 18 for detecting the air fuel ratio of the exhaust gas.

In addition, an exhaust gas recirculation device 13 (hereinafter referred to as an EGR device 13) is attached to the internal combustion engine 1. This EGR device 13 is constructed to include an exhaust gas recirculation passage 14 (hereinafter referred to as an EGR passage 14) and a flow rate regulation valve 15 (hereinafter referred to as an EGR valve 15). The EGR passage 14 connects the exhaust passage 6 and the intake passage 4 with each other. A part of the exhaust gas (hereinafter referred to as an EGR gas) passing through the exhaust passage 6 is recirculated to the intake passage 4 through this EGR passage 14. On the EGR passage 14, there is mounted the EGR valve 15 that is opened and closed by a signal from an ECU 10 to be described later for regulating the flow rate of the EGR gas passing through the EGR passage 14.

In this embodiment, the amount of intake air is controlled based on the output value of the air flow meter 12 in a feedback manner so that the flow rate of the EGR gas flowing into the internal combustion engine 1 is adjusted to a proper rate in accordance with the operating state of the internal combustion engine 1 at that time (hereinafter referred to as intake air amount feedback control). Here, the EGR gas and fresh air passing through the air flow meter 12 are sucked into the internal combustion engine 1, and there is a relation in which the amount of fresh air decreases in accordance with the increasing amount of EGR gas sucked to the internal combustion engine, and the amount of fresh air increases in accordance with the decreasing amount of EGR gas. Accordingly, the amount of EGR gas can be detected based on the output signal of the air flow meter 12. In this embodiment, the amount of intake air or the amount of EGR gas, which becomes a target corresponding to the operating state of the internal combustion engine at that time, is obtained by a prescribed map, and the throttle valve 5 and the EGR valve 15 are controlled in such a manner that the amount of intake air detected by the air flow meter 12 become equal to the target amount of intake air.

In case where the internal combustion engine 1 is operated in a lean-burn mode, it is necessary to reduce the NOx occluded in the NOx catalyst before the NOx occlusion capacity of the NOx catalyst is saturated.

Accordingly, in this embodiment, provision is made for a fuel addition valve 16 that serves to add a reducing agent in the form of fuel ( light oil) to the exhaust gas passing through a portion of the exhaust passage 6 upstream of the filter 7. Here, note that the fuel addition valve 16 is driven to open for fuel injection by means of a signal from the ECU 10 to be described later. The fuel injected from the fuel addition valve 16 into the exhaust passage 6 serves to enrich the air fuel ratio of the exhaust gas flowing from an upstream side of the exhaust passage 6, and at the same time to reduce the NOx occluded in the NOx catalyst. When the NOx is reduced, so-called rich spike control is carried out that serves to enrich the air fuel ratio of the exhaust gas flowing into the filter 7 in a spike-like manner ( for a short time) at a short cycle. The exhaust gas air fuel ratio variation section according to the present invention comprises the fuel addition valve 16 and the ECU 10 that performs rich spike control.

In this embodiment, the amount of fuel addition is controlled in a feedback manner so that the output signal of the air fuel ratio sensor 9 becomes a target rich air fuel ratio when rich spike control is performed by the addition of fuel from the fuel addition valve 16. Hereinafter, this control is referred to as fuel addition amount feedback control. In addition, in this embodiment, the feedback control of the amount of fuel to be supplied from the fuel injection valve 3 is not performed.

The ECU 10 in the form of an electronic control unit for controlling the internal combustion engine 1 is provided in conjunction with the internal combustion engine 1 as constructed in the above-described manner. This ECU 10 serves to control the operating state of the internal combustion engine 1 in accordance with the operating condition of the internal combustion engine 1 and driver's requirements.

Connected to the ECU 10 through electrical wiring is the accelerator opening sensor 11 which outputs a signal corresponding to the degree of accelerator opening, in addition to the exhaust gas temperature sensor 8, the air fuel ratio sensor 9, the upstream exhaust gas temperature sensor 17, the upstream side air fuel ratio sensor 18, and the air flow meter 12, so that the output signals of the sensors, etc., are input to the ECU 10.

On the other hand, the fuel injection valves 3, the throttle valve 5, the EGR valve 15, and the fuel addition valve 16 are connected to the ECU 10 through electrical wiring, so that they can be controlled by the ECU 10, and the amount of the intake air supplied for engine combustion can be adjusted by the opening and closing operation of the throttle valve 5.

The ECU 10 executes the above-mentioned intake air amount feedback control and the above-mentioned fuel addition amount feedback control. Here, note that in this embodiment, an intake air amount feedback control section according to the present invention is achieved by the intake air amount feedback control performed by the ECU 10. Also, in this embodiment, an exhaust gas air fuel ratio feedback control section according to the present invention is achieved by the fuel addition amount feedback control performed by the ECU 10.

Here, in order to accurately match the air fuel ratio of the exhaust gas flowing into the filter 7 to a target air fuel ratio according to the fuel addition amount feedback control, it is necessary to accurately detect the air fuel ratio of the exhaust gas by means of the air fuel ratio sensor 9. However, the output value of the air fuel ratio sensor 9 might be changed due to aging or failure, so it is also necessary to determine whether the air fuel ratio of the exhaust gas obtained by the air fuel ratio sensor 9 is accurate.

A determination as to whether malfunction occurs in the air fuel ratio sensor 9 can be made by detecting the air fuel ratio at the time of rich spike control. That is, the malfunction or malfunction of the air fuel ratio sensor 9 can be determined by making a comparison between a target air fuel ratio of the exhaust gas, which is obtained from the amount of fuel added by the fuel addition valve 16 and the amount of intake air supplied to the internal combustion engine 1, and the air fuel ratio of the exhaust gas obtained by the air fuel ratio sensor 9.

Here, note that in diesel engines, the fuel injected from the fuel injection valve 3 is decided by the number of revolutions per minute of the engine and the degree of accelerator opening, and a target amount of fresh intake air of the internal combustion engine is decided from the amount of EGR gas needed in the engine operating state at that time. In addition, the amount of fresh air actually sucked to the internal combustion engine 1 is measured by the air flow meter 12, and the above-mentioned intake air amount feedback control is carried out so as to control the amount of fresh air actually sucked to the internal combustion engine 1 at this time to the target value.

As a result, if malfunction occurs in either of the fuel injection valve 3, the air flow meter 12, the throttle valve 5 and the EGR valve 15, it becomes difficult to match the actual amount of fresh intake air to the target value. In such a case, the air fuel ratio of the exhaust gas changes, too, so when it is determined whether malfunction occurs in the air fuel ratio sensor 9, there arises a need to specify or identify whether the air fuel ratio measured by the air fuel ratio sensor 9 is deviated due to the occurrence of malfunction in the air fuel ratio sensor 9, or whether the actual air fuel ratio itself is changed due to the occurrence of malfunction in another device.

In this respect, in this embodiment, it is possible to specify in which device malfunction occurs. Such a specification or identification is made based on differences between sensor output values and the control values of the devices (hereinafter the sensor output values and the control values of the devices being referred to as "state values", collectively) and the reference values of the individual state values in the respective engine operating states (hereinafter referred to as reference values) when the intake air amount feedback control is performed while the above-mentioned rich spike control is not carried out, and when the intake air amount feedback control and the fuel addition amount feedback control are performed while the rich spike control is carded out, respectively. Here, in the air fuel ratio sensor 9, the state value is the output value of the air fuel ratio sensor 9; in the exhaust gas temperature sensor 8, it is the output value of the exhaust gas temperature sensor 8; in the air flow meter 12, it is the output value of the air flow meter 12; in the fuel injection valves 3, it is the amount of fuel to be injected from the fuel injection valve 3 under the control of the ECU 10; in the fuel addition valve 16, it is the amount of fuel to be added from the fuel addition valve 16 under the control of the ECU 10; and in the EGR device 13, it is the amount of EGR gas to be recirculated in the internal combustion engine 1 under the control of the ECU 10. Hereinafter, the amount of fuel to be injected by the fuel injection valve 3, the amount of fuel to be added by the fuel addition valve 16, and the amount of EGR gas to be recirculated in the internal combustion engine 1 under the control of the ECU 10 are referred to as the "command values" for the individual devices, respectively.

First of all, reference will be made to the changes of state values when malfunction occurs in the air fuel ratio sensor 9. When rich spike control is not performed (hereinafter referred to as at the time of normal operation), fuel addition amount feedback control is not carried out, either. That is, even when malfunction occurs in the air fuel ratio sensor 9, the output value of the air flow meter 12, the command value for the fuel injection valve 3, and the output value of the exhaust gas temperature sensor 8 do not change from their reference values, respectively, but when malfunction occurs in the air fuel ratio sensor 9, the output value of the air fuel ratio sensor 9 changes from its reference value. The word "change" herein referred to means that a difference between the output value and the reference value therefor increases to or above a prescribed value indicating malfunction. Accordingly, in this embodiment, the words "not change" includes not only the case of "not change at all" but also the case where the above-mentioned difference is less than the prescribed value indicating malfunction. The same is applied to differences between output values and reference values of other sensors and differences between command values and reference values of other devices.

On the other hand, when rich spike control is performed (hereinafter also referred to as at the time of the addition of exhaust gas), fuel addition amount feedback control is performed. That is, the fuel addition valve 16 is controlled in a feedback manner so that the output value of the air fuel ratio sensor 9 becomes its reference value. Thus, the output value of the air fuel ratio sensor 9 is made to match its reference value irrespective of whether malfunction occurs in the air fuel ratio sensor 9. However, when malfunction occurs in the air fuel ratio sensor 9, the amount of fuel to be added increases or decreases so the command value for the fuel addition valve 13 changes. As a result, the exhaust gas temperature and the temperature of the filter 7 change, and hence the output value of the exhaust gas temperature sensor 8 also changes from its reference value. In addition, at this time, neither the output value of the air flow meter 12 nor the command value for the fuel injection valve 3 does not change from the reference value therefor.

From these, it is possible to determine whether malfunction occurs in the air fuel ratio sensor 9.

First of all, reference will be made to the changes of state values when malfunction occurs in the exhaust gas temperature sensor 8. Fuel addition amount feedback control is not performed at the time of normal operation. Thus, even when malfunction occurs in the exhaust gas temperature sensor 8, the output value of the air flow meter 12, the command value for the fuel injection valve 3, and the output value of the air fuel ratio sensor 9 do not change from their reference values, respectively, but when malfunction occurs in the exhaust gas temperature sensor 8, the output value of the exhaust gas temperature sensor 8 changes from its reference value.

On the other hand, at the time of the addition of exhaust gas, fuel addition amount feedback control is performed so the air fuel ratio of the exhaust gas obtained by the air fuel ratio sensor 9 becomes its reference value. Accordingly, even when malfunction occurs in the exhaust gas temperature sensor 8, the amount of fuel to be added from the fuel addition valve 16 does not change from the reference value. Also, the output value of the air flow meter 12, the command value for the fuel injection valve 3, and the output value of the air fuel ratio sensor 9 does not change from their reference values, respectively. However, the output value of the exhaust gas temperature sensor 8 at the time of the addition of exhaust gas changes from its reference value due to the occurrence of malfunction in. the exhaust gas temperature sensor 8.

From these, it is possible to determine whether malfunction occurs in the exhaust gas temperature sensor 8.

Next, reference will be made to the changes of state values when malfunction occurs in the air flow meter 12. Even when malfunction occurs in the air flow meter 12, intake air amount feedback control is carried out so that the output value of the air flow meter 12 becomes its reference value at the time of normal engine. Accordingly, the output value of the air flow meter 12 is matched to the reference value. In addition, though the command value for the fuel injection valve 3 does not change from its reference value, the command value for the amount of EGR gas changes from its reference value by an amount of the intake air amount feedback control. Also, the air fuel ratio of the exhaust gas changes due to a change in the amount of fresh intake air, so the output value of the air fuel ratio sensor 9 changes from its reference value. In addition, the amount of fresh intake air and the amount of EGR gas of the internal combustion engine 1 change, so the temperature of a gas or mixture sucked into the internal combustion engine 1 accordingly changes. As a result, the exhaust gas temperature changes, and hence the output value of the exhaust gas temperature sensor 8 also changes from its reference value, but there is no change in the command value for the fuel injection valve 3.

On the other hand, at the time of the addition of exhaust gas, the output value of the air flow meter 12 can be matched to its reference value according to the intake air amount feedback control even when malfunction occurs in the air flow meter 12. Moreover, since the amount of fuel to be injected from the fuel injection valve 3 is not controlled in a feedback manner, so the command value for the fuel injection valve 3 does not change from its reference value. Further, the output value of the air fuel ratio sensor 9 does not change from its reference value according to the fuel addition amount feedback control, either. However, the command value for the amount of EGR gas changes from its reference value by the amount of the intake air amount feedback control. Thus, the amount of fresh intake air and the amount of EGR gas of the internal combustion engine 1 change, so the temperature of the gas or mixture sucked into the internal combustion engine 1 accordingly changes, as a consequence of which the exhaust gas temperature changes, and hence the output value of the exhaust gas temperature sensor 8 also changes from its reference value.

From these, it is possible to determine whether malfunction occurs in the air flow meter 12.

First of all, reference will be made to the changes of state values when malfunction occurs in the fuel injection valve 3. When malfunction occurs in the fuel injection valve 3, an excess or deficiency occurs in the output of the internal combustion engine 1 required by the driver, so the driver operates the accelerator. As a result, the reference value for the amount of fuel to be injected by the fuel injection valve 3 itself changes, and when malfunction occurs in the fuel injection valve 3 at the time of the normal operating state of the engine, the air fuel ratio of the exhaust gas is changed by the excess or deficiency of fuel, so the output value of the air fuel ratio sensor 9 and the output value of the exhaust gas temperature sensor 8 change from their reference values, respectively. However, the fuel injection valve 3 itself is 28 operated according to a command from the ECU 10, and hence the command value for the amount of fuel to be injected does not change from its reference value. In addition, the output value of the air flow meter 12 and the command value for the amount of EGR gas do not change from their reference values, respectively.

On the other hand, when malfunction occurs in the fuel injection valve 3 at the time of the addition of exhaust gas, the air fuel ratio of the exhaust gas is changed to the extent that the reference value for the amount of fuel to be injected from the fuel injection valve 3 itself changes. Therefore, the amount of fuel to be added from the fuel addition valve 16 is controlled in a feedback manner based on the air fuel ratio of the exhaust gas detected by the air fuel ratio sensor 9, so that the command value for the fuel addition valve 16 changes from its reference value. In addition, the fuel injection valve 3 itself is operated according to a command from the ECU 10, so the command value for the fuel injection valve 3 does not change from its reference value. Further, the amount of fresh intake air of the internal combustion engine 1 does not change, and hence the output value of the air flow meter 12 does not change from its reference value. Moreover, the amount of fuel to be added from the fuel addition valve 16 is controlled in a feedback manner, so the output value of the air fuel ratio sensor 9 and the output value of the exhaust gas temperature sensor 8 do not change from their reference values, respectively, and the command value for the amount of EGR gas does not change from its reference value, either.

From these, it is possible to determine whether malfunction occurs in the fuel injection valve 3.

First of all, reference will be made to the changes of state values when malfunction occurs in the fuel addition valve 16. At the time of normal operation, even if malfunction occurs in the fuel addition valve 16, the addition of fuel from the fuel addition valve 16 is not performed, so the output value of 29 the air fuel ratio sensor 9, the output value of the exhaust gas temperature sensor 8, the command value for the fuel injection valve 3 and the output value of the air flow meter 12 do not change from their reference values.

On the other hand, when malfunction occurs in the fuel addition valve 16 at the time of the addition of exhaust gas, the feedback control of the amount of fuel to be added is carried out based on the output value of the air fuel ratio sensor 9, so the amount of fuel to be added from the fuel addition valve 16 changes from its reference value, but the amount of fuel to be injected from the fuel injection valve 3 and the output value of the air flow meter 12 do not change from their reference values, respectively. In addition, the air fuel ratio of the exhaust gas is kept at an appropriate value according to fuel addition amount feedback control, so the output value of the air fuel ratio sensor 9 and the output value of the exhaust gas temperature sensor 8 do not change from their reference values, respectively.

From these, it is possible to determine whether malfunction occurs in the fuel addition valve 16.

The above-mentioned relations are collectively shown in FIG. 2. The leftmost column in FIG. 2 represents the names of devices for which malfunction is to be detected. In the uppermost row in FIG. 2, "lean" represents a normal operation in which rich spike control is not performed, and "rich" represents the addition of exhaust gas in which the air fuel ratio of the exhaust gas is made rich according to rich spike control. In the second row from top in FIG. 2, there are enumerated the names of devices whose state values shift or deviate from their reference values, respectively, when there occurs malfunction in a device for which malfunction is to be detected, and those devices which are indicated by circular marks in the lower rows have their state values changed from their reference values, respectively, upon occurrence of malfunction.

When the output value of the air fuel ratio sensor 9 changes from its reference value at the time of "lean", and in addition, when the output value of the exhaust gas temperature sensor 8 becomes its reference value, it can be specified that malfunction occurs in the air fuel ratio sensor 9. When the output value of the air fuel ratio sensor 9 is equal to its reference value at the time of "lean", and in addition, when the output value of the exhaust gas temperature sensor 8 is changed from its reference value, it can be specified that malfunction occurs in the exhaust gas temperature sensor 8. The output values of the air fuel ratio sensor 9 and the exhaust gas temperature sensor 8 change from their reference values at the time of "lean", and when the output value of the exhaust gas temperature sensor 8 changes from its reference value at the time of "rich", it can be specified that malfunction occurs in the air flow meter 12. Here, when the output values of the air fuel ratio sensor 9 and the exhaust gas temperature sensor 8 change from their reference values at the time of "lean", and further when the command value for the amount of EGR gas also changes from its reference value, it may be specified that malfunction occurs in the air flow meter 12. The output values of the air fuel ratio sensor 9 and the exhaust gas temperature sensor 8 change from their reference values at the time of "lean", and when the output value of the exhaust gas temperature sensor 8 becomes its reference value at the time of "rich", it can be specified that malfunction occurs in the fuel injection valve 3.

Here, the output values of the air fuel ratio sensor 9 and the exhaust gas temperature sensor 8 change from their reference values at the time of "lean", rich spike control may be executed in order to specify in which of the air flow meter 12 and the fuel injection valve 3 malfunction occurs. As a result, when the output value of the exhaust gas temperature sensor 8 changes from its reference value, it can be specified that malfunction occurs in the air flow meter 12, and when the output value of the exhaust gas temperature sensor 8 becomes its reference value, it can be specified that malfunction occurs in the fuel injection valve 3.

From the above, when malfunction occurs in either of the air fuel ratio sensor 9, the exhaust gas temperature sensor 8, the air flow meter 12, the fuel injection valve 3 and the fuel addition valve 16, it can be specified in which device malfunction occurs.

Next, reference will be made to a flow for detecting malfunction in sensors according to this embodiment.

Figure 3:
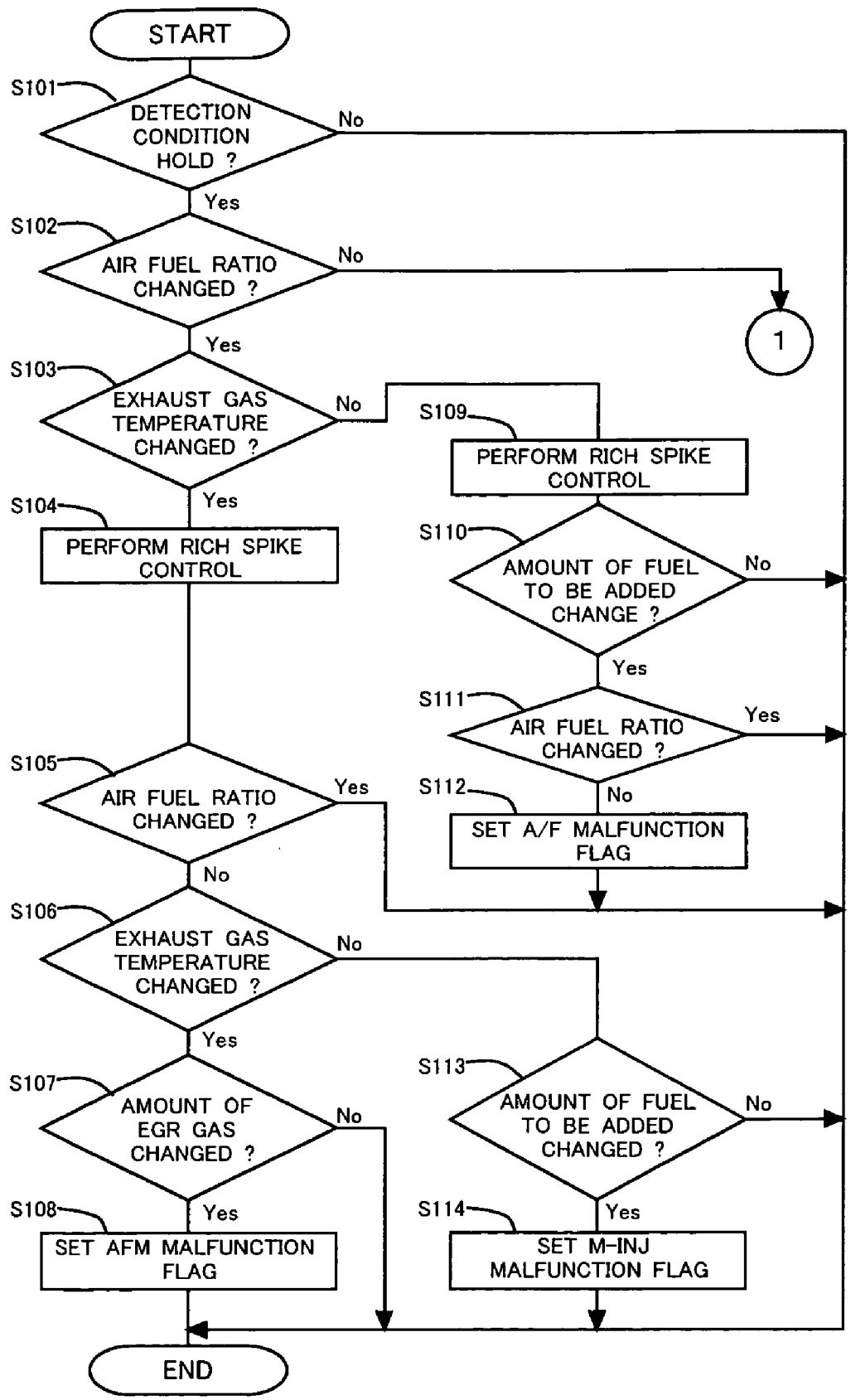
FIG. 3 is a flow chart showing a flow for detecting malfunction in a sensor or the like according to the first embodiment.
Figure 4:
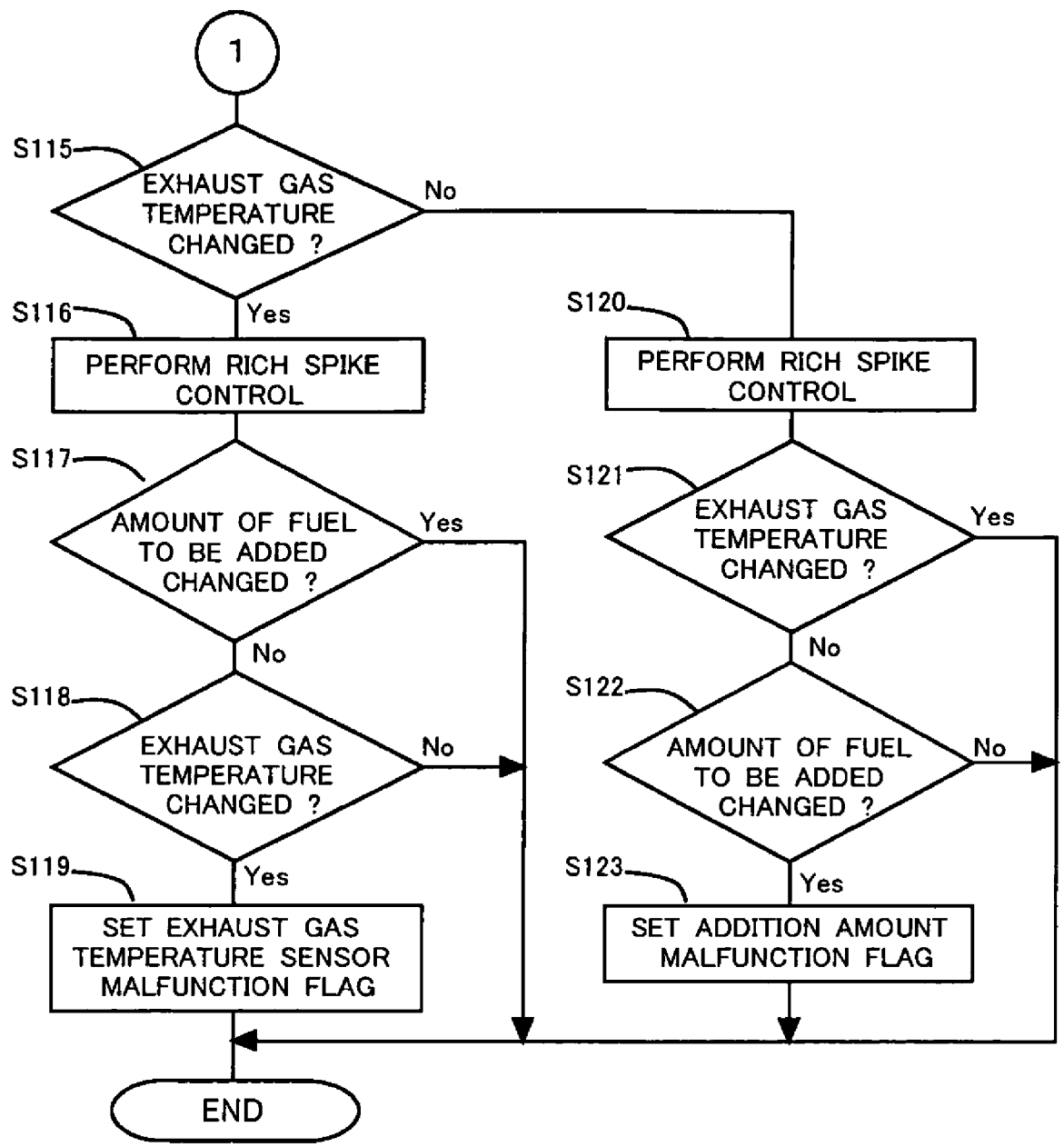
FIG. 4 is a flow chart showing the flow for detecting malfunction in a sensor or the like according to the first embodiment.

FIGS. 3 and 4 are flow chart views that illustrate the flow for detecting malfunction in sensors or the like according to this embodiment.

In step S101, the ECU 10 determines whether a condition for performing malfunction detection of the air fuel ratio sensor 9, etc., holds. For example, it is determined whether the warming up of the internal combustion engine 1 is completed.

When an affirmative determination is made in step S101, the control flow proceeds to step S102, whereas when a negative determination is made, this routine is once ended.

In step S102, the ECU 10 determines whether the output value of the air fuel ratio sensor 9 has changed from its reference value.

When an affirmative determination is made in step S102, the control flow proceeds to step S103, whereas when a negative determination is made, the control flow proceeds to step S115.

In step S103, the ECU 10 determines whether the output value of the exhaust gas temperature sensor 8 has changed from its reference value.

When an affirmative determination is made in step S103 the control flow proceeds to step S104, whereas when a negative determination is made, the control flow proceeds to step S1 09.

In step S104, the ECU 10 executes rich spike control.

In step S105, the ECU 10 determines whether the output value of the air fuel ratio sensor 9 has changed from its reference value.

When an affirmative determination is made in step S105, this routine is once ended, whereas when a negative determination is made, the control flow proceeds to step S1 06.

In step S106, the ECU 10 determines whether the output value of the exhaust gas temperature sensor 8 has changed from its reference value.

When an affirmative determination is made in step S106, the control flow proceeds to step S107, whereas when a negative determination is made, the control flow proceeds to step S113.

In step S107, the ECU 10 determines whether the command value for the EGR gas has changed from its reference value.

When an affirmative determination is made in step S107, the control flow proceeds to step S108, whereas when a negative determination is made, this routine is once ended.

In step S108, the ECU 10 sets an AFM malfunction flag (ON) indicating that the air flow meter 12 is malfunction.

In step S109, the ECU 10 executes rich spike control.

In step S110, the ECU 10 determines whether the command value for the fuel addition valve 16 has changed from its reference value.

When an affirmative determination is made in step S110, the control flow proceeds to step Sill, whereas when a negative determination is made, this routine is once ended.

In step S111, the ECU 10 determines whether the output value of the air fuel ratio sensor 9 has changed from its reference value.

When an affirmative determination is made in step S111, this routine is once ended, whereas when a negative determination is made, the control flow proceeds to step S1 12.

In step S112, the ECU 10 sets an A/F malfunction flag (ON) indicating that malfunction occurs in the air fuel ratio sensor 9.

In step S113, the ECU 10 determines whether the command value for the fuel addition valve 16 has changed from its reference value.

When an affirmative determination is made in step S113, the control flow proceeds to step S114,.whereas when a negative determination is made, this routine is once ended.

In step S114, the ECU 10 sets an M-INJ malfunction flag (ON) indicating that malfunction occurs in the fuel injection valve 3.

In step S115, the ECU 10 determines whether the output value of the exhaust gas temperature sensor 8 has changed from its reference value.

When an affirmative determination is made in step S115, the control flow proceeds to step S116, whereas when a negative determination is made, the control flow proceeds to step Si20.

In step S116, the ECU 10 executes rich spike control.

In step S117, the ECU 10 determines whether the command value for the fuel addition valve 16 has changed from its reference value.

When an affirmative determination is made in step S117, this routine is once ended, whereas when a negative determination is made, the control flow proceeds to step S118.

In step S118, the ECU 10 determines whether the, output value of the exhaust gas temperature sensor 8 has changed from its reference value.

When an affirmative determination is made in step S118, the control flow proceeds to step S119, whereas when a negative determination is made, this routine is once ended.

In step S119, the ECU 10 sets an exhaust gas temperature sensor malfunction flag (ON) indicating that malfunction occurs in the exhaust gas temperature sensor 8.

In step S120, the ECU 10 executes rich spike control.

In step S121, the ECU 10 determines whether the output value of the exhaust gas temperature sensor 8 has changed from its reference value.

When an affirmative determination is made in step S121, this routine is once ended, whereas when a negative determination is made, the control flow proceeds to step S1 22.

In step S122, the ECU 10 determines whether the command value for the fuel addition valve 16 has changed from its reference value.

When an affirmative determination is made in step S122, the control flow proceeds to step S123, whereas when a negative determination is made, this routine is once ended.

In step S123, the ECU 10 sets an fuel addition amount malfunction flag (ON) indicating that malfunction occurs in the fuel addition valve 16.

Then, by specifying which flag is set, it is possible to specify in which of the air fuel ratio sensor 9, the exhaust gas temperature sensor 8, the air flow meter 12, the fuel injection valve 3 and the fuel addition valve 16 malfunction occurs.

Next, reference will be made to another form of flow for detecting malfunction in sensors according to this embodiment.

Figure 5:
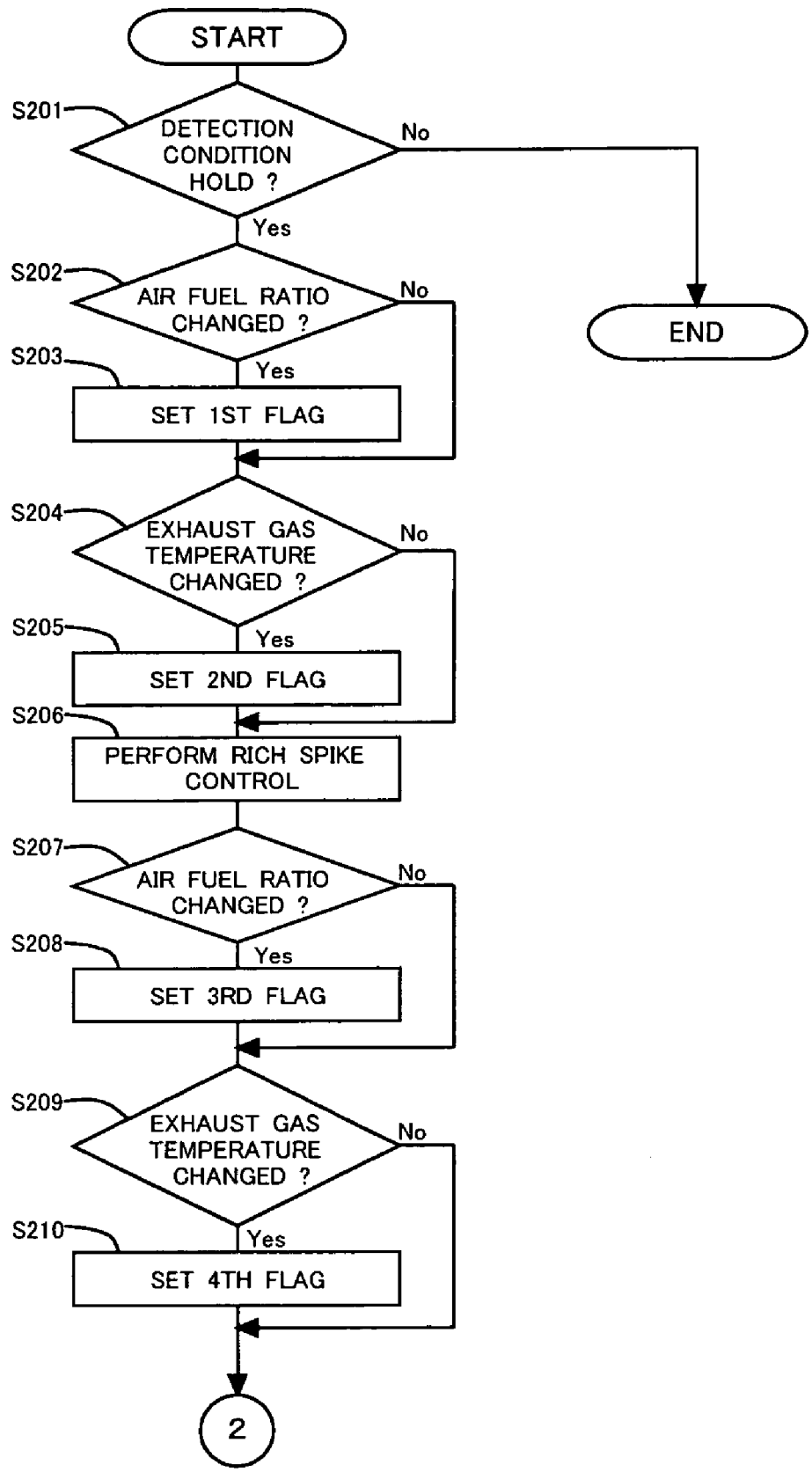
FIG. 5 is a flow chart showing another form of flow for detecting malfunction in a sensor or the like according to the first embodiment.
Figure 6:
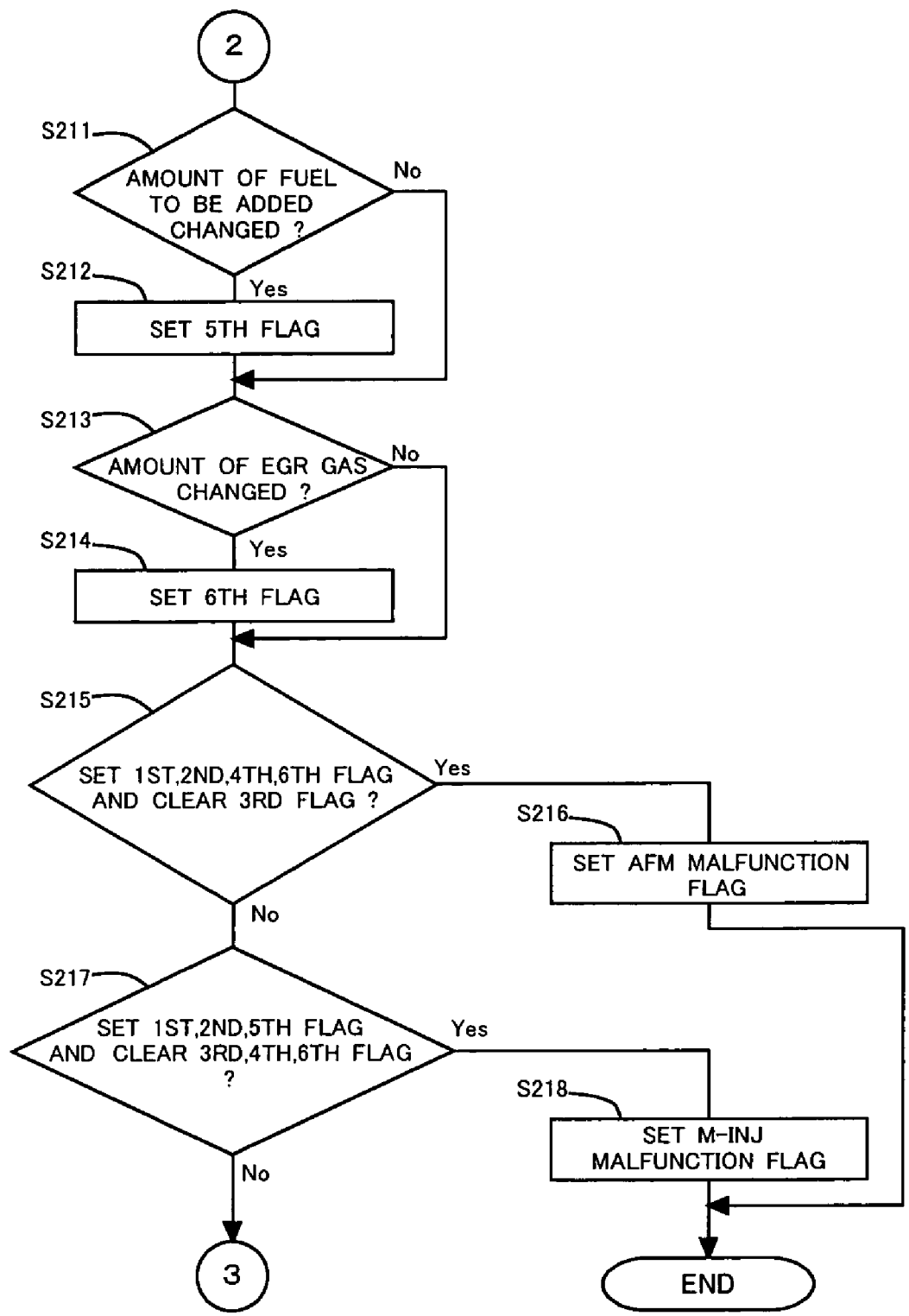
FIG. 6 is a flow chart showing a further form of flow for detecting malfunction in a sensor or the like according to the first embodiment.
Figure 7:
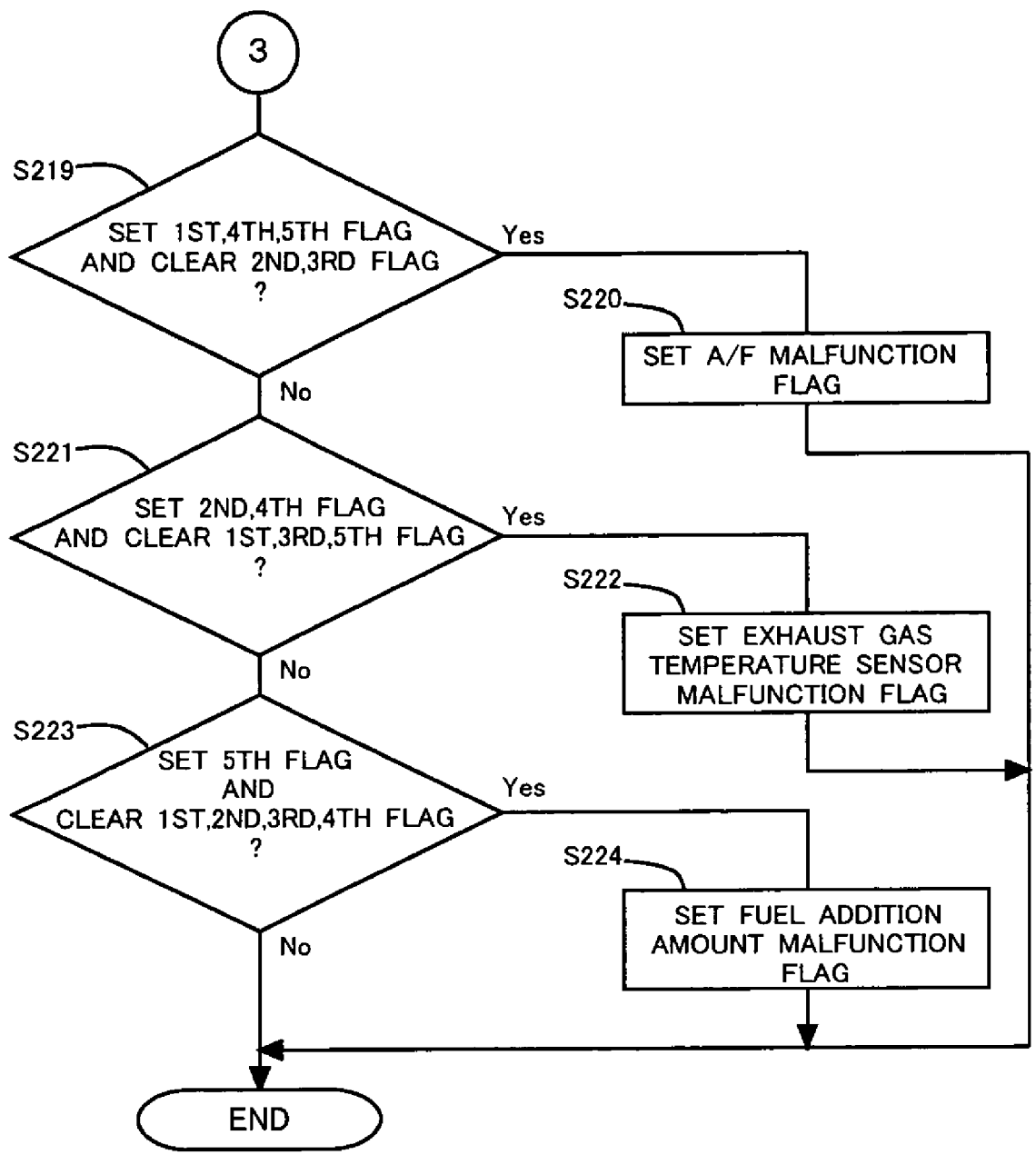
FIG. 7 is a flow chart showing a still further form of flow for detecting malfunction in a sensor or the like according to the first embodiment.

FIGS. 5, 6 and 7 are flow charts showing the another form of flow for detecting malfunction in sensors or the like according to this embodiment.

In step S201, the ECU 10 determines whether a condition for performing malfunction detection of the air fuel ratio sensor 9, etc., holds. For example, it is determined whether the warming up of the internal combustion engine 1 is completed.

When an affirmative determination is made in step S201, the control flow proceeds to step S202, whereas when a negative determination is made, this routine is once ended.

In step S202, the ECU 10 determines whether the output value of the air fuel ratio sensor 9 has changed from its reference value.

When an affirmative determination is made in step S202, the control flow proceeds to step S203, whereas when a negative determination is made, the control flow proceeds to step S204.

In step S203, the ECU 10 sets a first flag (ON) indicating that the output value of the air fuel ratio sensor 9 has changed from its reference value.

In step S204, the ECU 10 determines whether the output value of the exhaust gas temperature sensor 8 has changed from its reference value.

When an affirmative determination is made in step S204, the control flow proceeds to step S205, whereas when a negative determination is made, the control flow proceeds to step S206.

In step S205, the ECU 10 sets a second flag (ON) indicating the output value of the exhaust gas temperature sensor 8 has changed from its reference value.

In step S206, the ECU 10 executes rich spike control.

In step S207, the ECU 10 determines whether the output value of the air fuel ratio sensor 9 has changed from its reference value.

When an affirmative determination is made in step S207, the control flow proceeds to step S208, whereas when a negative determination is made, the control flow proceeds to step S209.

In step S208, the ECU 10 sets a third flag (ON) indicating that the output value of the air fuel ratio sensor 9 has changed from its reference value.

In step S209, the ECU 10 determines whether the output value of the exhaust gas temperature sensor 8 has changed from its reference value.

When an affirmative determination is made in step S209, the control flow proceeds to step S210, whereas when a negative determination is made, the control flow proceeds to step S211.

In step S210, the ECU 10 sets a fourth flag (ON) indicating the output value of the exhaust gas temperature sensor 8 has changed from its reference value.

In step S211, the ECU 10 determines whether the command value for the fuel addition valve 16 has changed from its reference value.

When an affirmative determination is made in step S211, the control flow proceeds to step S212, whereas when a negative determination is made, the control flow proceeds to step S213.

In step S212, the ECU 10 sets a fifth flag (ON) indicating the command value for the fuel addition valve 16 has changed from its reference value.

In step S213, the ECU 10 determines whether the command value for the EGR gas has changed from its reference value.

When an affirmative determination is made in step S213, the control flow proceeds to step S214, whereas when a negative determination is made, the control flow proceeds to step S215.

In step S214, the ECU 10 sets a sixth flag (ON) indicating the command value for the amount of EGR gas has changed from its reference value.

In step S215, the ECU 10 determines whether the first flag, the second flag, the fourth flag, and the sixth flag are set (ON), and whether the third flag is cleared (OFF).

When an affirmative determination is made in step S215, the control flow proceeds to step S216, whereas when a negative determination is made, the control flow proceeds to step S217.

In step S216, the ECU 10 sets the AFM malfunction flag (ON) indicating that the air flow meter 12 is malfunction.

In step S217, the ECU 10 determines whether the first flag, the second flag, and the fifth flag are set (ON), and whether the third flag, the fourth flag, and the sixth flag are cleared (OFF).

When an affirmative determination is made in step S217, the control flow proceeds to step S218, whereas when a negative determination is made, the control flow proceeds to step S219.

In step S218, the ECU 10 sets the M-INJ malfunction flag (ON) indicating that malfunction occurs in the fuel injection valve 3.

In step S219, the ECU 10 determines whether the first flag, the fourth flag, and the fifth flag are set (ON), and whether the second flag and the third flag are cleared (OFF).

When an affirmative determination is made in step S219, the control flow proceeds to step S220, whereas when a negative determination is made, the control flow proceeds to step S221.

In step S220, the ECU 10 sets the A/F malfunction flag (ON) indicating that malfunction occurs in the air fuel ratio sensor 9.

In step S221, the ECU 10 determines whether the second flag and the fourth flag are set (ON), and whether the first flag, the third flag, and the fifth flag are cleared (OFF).

When an affirmative determination is made in step S221, the control flow proceeds to step S222, whereas when a negative determination is made, the control flow proceeds to step S223.

In step S222, the ECU 10 sets the exhaust gas temperature sensor malfunction flag (ON) indicating that malfunction occurs in the exhaust gas temperature sensor 8.

In step S223, the ECU 10 determines whether the fifth flag is set (ON), and whether the first flag, the second flag, third flag, and the fourth flag are cleared (OFF).

When an affirmative determination is made in step S223, the control flow proceeds to step S224, whereas when a negative determination is made, this routine is once ended.

In step S224, the ECU 10 sets an fuel addition amount malfunction flag (ON) indicating that malfunction occurs in the fuel addition valve 16.

Then, by specifying which flag is set, it is possible to specify in which of the air fuel ratio sensor 9, the exhaust gas temperature sensor 8, the air flow meter 12, the fuel injection valve 3 and the fuel addition valve 16 malfunction occurs.

As described above, according to this embodiment, from the relations among the output value of the air fuel ratio sensor 9, the output value of the exhaust gas temperature sensor 8, the output value of the air flow meter 12, the command value for the fuel injection valve 3, the command value for the fuel addition valve 16, the command value for the EGR gas, and their individual reference values between when rich spike control is not performed and when rich spike control is performed, it is possible to specify in which of the air fuel ratio sensor 9, the exhaust gas temperature sensor 8, the air flow meter 12, the fuel injection valve 3 and the fuel addition valve 16, malfunction occurs.

Here, note that in this embodiment, the malfunction of the upstream side air fuel ratio sensor 18 may be detected in place of that of the air fuel ratio sensor 9. In addition, the malfunction of the upstream exhaust gas temperature sensor 17 may also be detected in place of that of the exhaust gas temperature sensor 8.

Embodiment 2

In this embodiment, when malfunction is detected in both of malfunction detections as a result of the malfunction detections which have been carried out by two different methods, it is finally decided that malfunction really occurs. Other hardware is common with that of the first embodiment, and hence an explanation thereof is omitted.

First of all, as a first malfunction detection method, malfunction detection being described in the first embodiment is carried out for each of the air fuel ratio sensor 9 and the upstream side air fuel ratio sensor 18. Then, as a second malfunction detection method, a difference between the output value of the air fuel ratio sensor 9 and the output value of the upstream side air fuel ratio sensor 18 in a specific operating state is calculated, and a determination is made as to whether this difference is greater than or equal to a prescribed value that indicates malfunction. In the second malfunction detection method, when this difference becomes greater than or equal to the prescribed value indicating malfunction, it is determined that malfunction occurs in any of the sensors.

Finally, only when malfunction has been detected in any of the sensors according to the second malfunction detection method, it is determined that malfunction really occurs in a sensor in which malfunction has been detected according to the first malfunction detection method. That is, it is not clear whether malfunction really occurs, except when malfunction has been detected in both the malfunction detection methods, so the malfunction determination is not fixed but kept in a pending state.

Here, as described in the above-mentioned first embodiment, by performing malfunction detection for each of the air fuel ratio sensor 9 and the upstream side air fuel ratio sensor 18, malfunction of each sensor can be determined. As described in the above-mentioned first embodiment, in order to detect malfunction or failure of the air fuel ratio sensor 9 and the upstream side air fuel ratio sensor 18, there is no need to perform the addition of fuel by the fuel addition valve 16 and the feedback control of the amount of fuel to be added.

On the other hand, in a specific operating state, malfunction of the sensors can be detected by making a comparison between the air fuel ratios of the exhaust gas obtained from the air fuel ratio sensor 9 and the upstream side air fuel ratio sensor 18, respectively. That is, when the difference between the air fuel ratio obtained from the air fuel ratio sensor 9 and the air fuel ratio obtained from the upstream side air fuel ratio sensor 18 is greater than or equal to a predetermined value, it can be determined that malfunction occurs in either of these sensors. This is because when malfunction occurs in air fuel ratio sensors, malfunction rarely occurs in a plurality of air fuel ratio sensors at the same time. Here, note that a "specific operating state" is, preferably, a state in which the air fuel ratio of the exhaust gas is lean, and the addition of fuel from the fuel addition valve 16 or the auxiliary injection of the fuel injection valve 3, which lowers the concentration of oxygen in the exhaust gas, is not performed. That is, this is because when the exhaust gas of a rich air fuel ratio passes through the NOx catalyst, the NOx and oxygen occluded in the NOx catalyst are released so that the air fuel ratio of the exhaust gas at a downstream side of the filter 7 is made into a value in the vicinity of a stoichiometric air fuel ratio, and the air fuel ratio sensor 9 will receive this influence. In addition, when the exhaust gas of a rich air fuel ratio passes through the NOx catalyst, fuel reacts in the NOx catalyst so that the air fuel ratio sensor 9 might receive this influence.

In the malfunction detection described in the first embodiment, even when malfunction is detected in the air fuel ratio sensor 9 or the upstream side air fuel ratio sensor 18, a final decision of malfunction is not made immediately, but the decision of malfunction is further fixed or finally made only when it is determined, as a result of a comparison between the output values of both the sensors, that malfunction occurs in either of the sensors.

Thus, in the case of provision of a plurality of air fuel ratio sensors, it is possible to make the malfunction detection of the air fuel ratio sensors more accurately.

Moreover, malfunction determination as described in the above-mentioned embodiment 1 may be performed for the air fuel ratio sensors 9 and the upstream side air fuel ratio sensor 18, respectively, and when determined that only one of the air fuel ratio sensors is malfunction, such a determination that the one air fuel ratio sensor 9 is fail may be fixed or made final, whereas when determined that malfunction occurs in a plurality of air fuel ratio sensors 9, malfunction detection may be made again. Thus, the accuracy of malfunction determination can be improved by performing repeated malfunction determinations.

In this embodiment, reference has been made to the air fuel ratio sensors, but in place of these sensors, the same can be applied to the malfunction detection of exhaust gas temperature sensors. Here, note that a "specific operating state" in the malfunction detection of the exhaust gas temperature sensors 8 and the upstream exhaust gas temperature sensor 17 is, preferably, a state in which the air fuel ratio of the exhaust gas is lean, and the addition of fuel from the fuel addition valve 16 or the auxiliary injection of the fuel injection valve 3, which lowers the concentration of oxygen in the exhaust gas, is not performed. That is, this is because when the exhaust gas of a rich air fuel ratio passes through the NOx catalyst, fuel might react in the NOx catalyst to raise the temperature of the exhaust gas, so that the exhaust gas temperature sensor 8 might receive this influence.

The invention claimed is:

1. A malfunction detection system for an internal combustion engine comprising:
   an air fuel ratio detection section that detects the air fuel ratio of an exhaust gas of an internal combustion engine;
   an EGR device that connects an intake system and an exhaust system of said internal combustion engine for recirculating a part of the exhaust gas to the intake system;
   an exhaust gas air fuel ratio feedback control section that controls, in a feedback manner, the air fuel ratio of the exhaust gas to a predetermined air fuel ratio based on the air fuel ratio of the exhaust gas detected by said air fuel ratio detection section;

an intake air amount feedback control section that changes the amount of the exhaust gas recirculated by said EGR device in such a manner that the amount of fresh air sucked to said internal combustion engine is adjusted to a target amount;

a state value detection section that detects the state values of a plurality of items, respectively, related to a change in the air fuel ratio of the exhaust gas in individual operating states including when said engine is in a first operating state in which feedback control according to said exhaust gas air fuel ratio feedback control section is not performed but feedback control according to said intake air amount feedback control section is performed, and when said engine is in a second operating state in which both feedback control according to said exhaust gas air fuel ratio feedback control section and feedback control according to said intake air amount feedback control section are performed;

a first item identification section that identifies items whose state values detected by said state value detection section in said first operating state are outside of a normal value range that is set with respect to the state value of each item in said first operating state;

a second item identification section that identifies items whose state values detected by said state value detection section in said second operating state are outside of a normal value range that is set with respect to the state value of each item in said second operating state; and a malfunction item identification section that identifies which item is malfunction, from the items specified by said first item identification section and from the items identified by said second item identification section.

2. A malfunction detection system for an internal combustion engine comprising:

an air fuel ratio detection section that detects the air fuel ratio of an exhaust gas of an internal combustion engine;

an EGR device that connects an intake system and an exhaust system of said internal combustion engine for recirculating a, part of the exhaust gas to the intake system;

an exhaust gas air fuel ratio feedback control section that controls, in a feedback manner, the air fuel ratio of the exhaust gas to a predetermined air fuel ratio based on the air fuel ratio of the exhaust gas detected by said air fuel ratio detection section;

an intake air amount feedback control section that changes the amount of the exhaust gas recirculated by said EGR device in such a manner that the amount of fresh air sucked to said internal combustion engine is adjusted to a target amount;

a first state value detection section that detects the state values of a plurality of items, respectively, related to a change in the air fuel ratio of the exhaust gas in a first operating state in which feedback control according to said exhaust gas air fuel ratio feedback control section is not performed but feedback control according to said intake air amount feedback control section is performed;

a first item identification section that identifies items whose state values detected by said state value detection section in said first operating state are outside of a normal value range that is set with respect to the state value of each item in said first operating state;

an exhaust gas air fuel ratio variation section that makes the air fuel ratio of the exhaust gas vary when there are two or more items identified by said first item identification section;

a second state value detection section that detects the state values of a plurality of items, respectively, related to a change in the air fuel ratio of the exhaust gas in a second operating state in which feedback control according to said exhaust gas air fuel ratio feedback control section and feedback control according to said intake air amount feedback control section are performed, after the air fuel ratio of the exhaust gas is made to vary by said exhaust gas air fuel ratio variation section;

a second item identification section that identifies items whose state values detected by said second state value detection section in said second operating state are outside of a normal value range that is set with respect to the state value of each item in said second operating state; and a malfunction item identification section that identifies which item is malfunction, from the items specified by said first item identification section and from the items identified by said second item identification section.

3. A malfunction detection system for an internal combustion engine comprising:

an air fuel ratio sensor that detects the air fuel ratio of an exhaust gas of an internal combustion engine;

an intake air amount detection device that detects the amount of fresh air sucked to said internal combustion engine;

a fuel injection valve that supplies fuel to a cylinder of said internal combustion engine;

an exhaust gas temperature sensor that detects the temperature of the exhaust gas of said internal combustion engine;

a fuel addition valve that adds fuel to an exhaust passage at a location upstream of said air fuel ratio sensor and said exhaust gas temperature sensor;

a fuel addition amount feedback control section that changes the amount of fuel to be added from said fuel addition valve so as to adjust the air fuel ratio of the exhaust gas detected by said air fuel ratio sensor to a target air fuel ratio when fuel is added from said fuel addition valve;

an EGR device that connects an intake system and an exhaust system of said internal combustion engine for recirculating a part of the exhaust gas to the intake system;

an intake air amount feedback control section that changes the amount of the exhaust gas recirculated by said EGR device in such a manner that the amount of fresh air detected by said intake air amount detection device is adjusted to a target amount;

a lean-time air fuel ratio difference calculation section that determines whether a difference between the air fuel ratio detected by said air fuel ratio sensor and said reference lean air fuel ratio is greater than or equal to a first predetermined value when feedback control according to said intake air amount feedback control section is performed but feedback control according to said fuel addition amount feedback control section is not performed, with said internal combustion engine being operated to achieve a reference lean air fuel ratio set as a target;

a lean-time exhaust gas temperature difference calculation section that determines whether a difference between the exhaust gas temperature detected by said exhaust gas temperature sensor and a reference exhaust gas temperature at this time is greater than or equal to a second predetermined value when feedback control according to said intake air amount feedback control section is performed but feedback control according to said fuel addition amount feedback control section is not performed, with said internal combustion engine being operated to achieve a reference lean air fuel ratio set as a target; and a rich-time exhaust gas temperature difference calculation section that determines whether a difference between the exhaust gas temperature, which is detected by said exhaust gas temperature sensor when the addition of fuel from said fuel addition valve, feedback control according to said fuel addition amount feedback control section and feedback control according to said intake air amount feedback control section are performed in such a manner that the air fuel ratio detected by said air fuel ratio sensor is adjusted to a reference rich air fuel ratio, and a reference exhaust gas temperature at this time is greater than or equal to a third predetermined value;

wherein when it is determined by said lean-time air fuel ratio calculation section that the difference between the air fuel ratio detected by said air fuel ratio sensor and said reference lean air fuel ratio is greater than or equal to a first predetermined value, and when it is determined by said lean-time exhaust gas temperature difference calculation section that the difference between the exhaust gas temperature detected by said exhaust gas temperature sensor and a reference exhaust gas temperature at this time is less than said second predetermined value, it is specified that malfunction occurs in said air fuel ratio sensor;

when it is determined by said lean-time air fuel ratio difference calculation section that the difference between the air fuel ratio detected by said air fuel ratio sensor and said reference lean air fuel ratio is less than the first predetermined value, and when it is determined by said lean-time exhaust gas temperature difference calculation section that the difference between the exhaust gas temperature detected by said exhaust gas temperature sensor and the reference exhaust gas temperature at this time is greater than or equal to the second predetermined value, it is specified that malfunction occurs in said exhaust gas temperature sensor;

when it is determined by said lean-time air fuel ratio difference calculation section that the difference between the air fuel ratio detected by said air fuel ratio sensor and said reference lean air fuel ratio is greater than or equal to the first predetermined value, and when it is determined by said lean-time exhaust gas temperature difference calculation section that the difference between the exhaust gas temperature detected by said exhaust gas temperature sensor and the reference exhaust gas temperature at this time is greater than or equal to the second predetermined value, and further when it is determined by said rich-time exhaust gas temperature difference calculation section that the difference between the exhaust gas temperature detected by said exhaust gas temperature sensor and the reference exhaust gas temperature at this time is less than the third predetermined value, it is specified that malfunction occurs in the amount of injection of said fuel injection valve; and when it is determined by said lean-time air fuel ratio calculation section that the difference between the air fuel ratio detected by said air fuel ratio sensor and said reference lean air fuel ratio is greater than or equal to a first predetermined value, and when it is determined by said lean-time exhaust gas temperature difference calculation section that the difference between the exhaust gas temperature detected by said exhaust gas temperature sensor and the reference exhaust gas temperature at this time is greater than or equal to the second predetermined value, and further when it is determined by said rich-time exhaust gas temperature difference calculation section that the difference between the exhaust gas temperature detected by said exhaust gas temperature sensor and the reference exhaust gas temperature at this time is greater than or equal to the third predetermined value, it is specified that there is malfunction in said intake air amount detection device.

4. A malfunction detection system for an internal combustion engine comprising:

an air fuel ratio sensor that detects the air fuel ratio of an exhaust gas of an internal combustion engine;

an intake air amount detection device that detects the amount of fresh air sucked to said internal combustion engine;

a fuel injection valve that supplies fuel to a cylinder of said internal combustion engine;

an exhaust gas temperature sensor that detects the temperature of the exhaust gas of said internal combustion engine;

an EGR device that connects an intake system and an exhaust system of said internal combustion engine for recirculating a part of the exhaust gas to the intake system;

an intake air amount feedback control section that changes the amount of the exhaust gas recirculated by said EGR device in such a manner that the amount of fresh air detected by said intake air amount detection device is adjusted to a target amount;

a lean-time air fuel ratio difference calculation section that determines whether a difference between the air fuel ratio detected by said air fuel ratio sensor and a reference lean air fuel ratio is greater than or equal to a first predetermined value when feedback control according to said intake air amount feedback control section is performed, and when said internal combustion engine is operated to achieve the reference lean air fuel ratio as a target;

a lean-time exhaust gas temperature difference calculation section that determines a difference between the exhaust gas temperature detected by said exhaust gas temperature sensor and a reference exhaust gas temperature at this time is greater than or equal to a second predetermined value when feedback control according to said intake air amount feedback control section is performed, and when said internal combustion engine is operated to achieve the reference lean air fuel ratio as a target; a fuel addition valve that adds fuel to an exhaust passage at a location upstream of said air fuel ratio sensor and said exhaust gas temperature sensor when it is determined by said lean-time air fuel ratio difference calculation section that the difference between the air fuel ratio detected by said air fuel ratio sensor and said reference lean air fuel ratio is greater than or equal to the first predetermined value, and when it is determined by said lean-time exhaust gas temperature difference calculation section that the difference between the exhaust gas temperature detected by said exhaust gas temperature sensor and the reference exhaust gas temperature at this time is greater than or equal to the second predetermined value;

a fuel addition amount feedback control section that changes the amount of fuel to be added from said fuel addition valve so as to adjust the air fuel ratio of the exhaust gas detected by said air fuel ratio sensor to a reference rich air fuel ratio when fuel is added from said fuel addition valve; and a rich-time exhaust gas temperature difference calculation section that determines whether a difference between the exhaust gas temperature, which is detected by said exhaust gas temperature sensor when the addition of fuel from said fuel addition valve, feedback control according to said fuel addition amount feedback control section and feedback control according to said intake air amount feedback control section are performed, and a reference exhaust gas temperature at this time is greater than or equal to a third predetermined value;

wherein when it is determined by said lean-time air fuel ratio calculation section that the difference between the air fuel ratio detected by said air fuel ratio sensor and said reference lean air fuel ratio is greater than or equal to a first predetermined value, and when it is determined by said lean-time exhaust gas temperature difference calculation section that the difference between the exhaust gas temperature detected by said exhaust gas temperature sensor and the reference exhaust gas temperature at this time is less than the second predetermined value, it is specified that malfunction occurs in said air fuel ratio sensor;

when it is determined by said lean-time air fuel ratio difference calculation section that the difference between the air fuel ratio detected by said air fuel ratio sensor and said reference lean air fuel ratio is less than the first predetermined value, and when it is determined by said lean-time exhaust gas temperature difference calculation section that the difference between the exhaust gas temperature detected by said exhaust gas temperature sensor and the reference exhaust gas temperature at this time is greater than or equal to the second predetermined value, it is specified that malfunction occurs in said exhaust gas temperature sensor;

when it is determined by said rich-time exhaust gas temperature difference calculation section that the difference between the exhaust gas temperature detected by said exhaust gas temperature sensor and the reference exhaust gas temperature at this time is less than the third predetermined value, it is specified that malfunction occurs in the amount of injection of said fuel injection valve; and when it is determined by said rich-time exhaust gas temperature difference calculation section that the difference between the exhaust gas temperature detected by said exhaust gas temperature sensor and the reference exhaust gas temperature at this time is greater than or equal to the third predetermined value, it is specified that there is malfunction in said intake air amount detection device.

5. The malfunction detection system for an internal combustion engine as set forth in claim 3, wherein a plurality of said air fuel ratio sensors are provided, and a final determination section is further provided that finalizes a malfunction determination of one air fuel ratio sensor in which malfunction is assumed to occur, when it is determined that malfunction occurs in one air fuel ratio sensor, and when a difference between a detected value of the one air fuel ratio sensor, in which malfunction is assumed to occur, and a detected value of another air fuel ratio sensor is greater than or equal to a predetermined value.

6. The malfunction detection system for an internal combustion engine as set forth in claim 4, wherein a plurality of said air fuel ratio sensors are provided, and a final determination section is further provided that finalizes a malfunction determination of one air fuel ratio sensor in which malfunction is assumed to occur, when it is determined that malfunction occurs in one air fuel ratio sensor, and when a difference between a detected value of the one air fuel ratio sensor, in which malfunction is assumed to occur, and a detected value of another air fuel ratio sensor is greater than or equal to a predetermined value.

\* \* \* \* \*